No. 727,041. PATENTED MAY 5, 1903.
E. WESTON.
INDEX NEEDLE OR POINTER FOR ELECTRICAL MEASURING INSTRUMENTS.
APPLICATION FILED MAY 7, 1902.
NO MODEL.
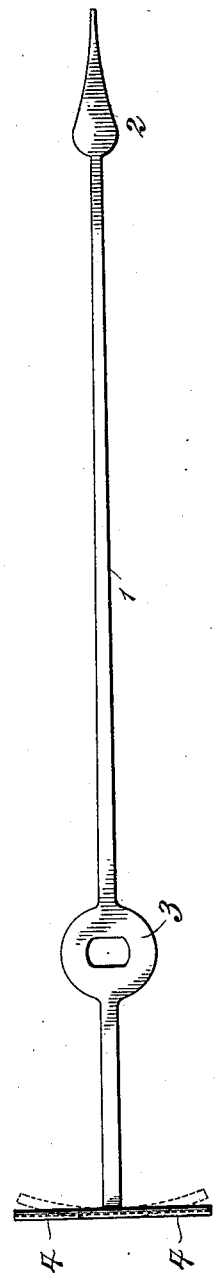

No. 727,041. Patented May 5, 1903.

UNITED STATES PATENT OFFICE.

EDWARD WESTON, OF NEWARK, NEW JERSEY.

INDEX NEEDLE OR POINTER FOR ELECTRICAL MEASURING INSTRUMENTS.

SPECIFICATION forming part of Letters Patent No. 727,041, dated May 5, 1903.

Application filed May 7, 1902. Serial No. 106,243. (No model.)

*To all whom it may concern:*

Be it known that I, EDWARD WESTON, a subject of the King of Great Britain, residing at Newark, in the county of Essex and State of New Jersey, have made a new and useful Invention in Index Needles or Pointers for Electrical Measuring Instruments, of which the following is a specification.

My invention has for its object the construction of an index needle or pointer and one or more adjustable or variable counterweights therefor in one integral piece and will be fully understood by referring to the accompanying drawings, in which—

Figure 1 is a plan view of my improved needle, and Fig. 2 a side elevational view thereof as seen looking at Fig. 1 from the bottom toward the top of the drawing.

In the use of electrical measuring instruments it is desirable that all of the movable parts thereof shall be as light as possible in order to prevent undue friction and momentum. Index needles or pointers for electrical measuring instruments and instruments of precision generally as heretofore constructed have been provided with detachable or adjustable counterweights for balancing the relative parts of the needle in such manner as to obtain the best results. Such an index-needle is disclosed in a prior patent granted to me by the United States Patent Office on the 4th day of October, 1898, and numbered 611,723.

The index-needle described and shown in the before-mentioned patent is constructed of three independent parts, preferably of aluminium, and is provided with three adjustable counterweights of brass or other material having sufficient weight to accomplish the result sought. I have found, however, that in certain types of electrical measuring instruments, particularly small instruments, such as pocket-voltmeters, it is desirable to make the index-needles much lighter and more compact than was possible with the construction disclosed in the before-mentioned patent. To this end I have devised an index needle or pointer and an adjustable or variable counterweight constructed in one integral piece, as will be understood by referring to the accompanying drawings in detail.

The index-needle hereinafter described and its counterweight are constructed in one integral piece, preferably of a light, soft, or pliable metal, such as aluminium, adapted to be bent, folded, or rolled at will.

1 represents the body of the needle, and 3 the supporting part thereof, whereby it is attached to the pivot-pin of the rotary part of the instrument, 2 being the pointer.

4 represents the counterweight, which is integral with or constitutes a part of the needle proper, the same being constructed of a rectangular sheet of the metal at the base of the needle by folding it back and forth upon itself one or more times in the manner shown, so as to increase the mass of the material to the desired amount at that point. After the needle is thus completed and placed upon the pivot-point and when the instrument is ready for final adjustment this counterweight is bent or curved inward in the manner shown in dotted lines until the desired balance is effected. I prefer to make the mass of the arms 4 4 and the base of the needle heavier than the body part 1 and pointer 2 before adjustment, so that the final adjustment may be effected by bending the arms inward, as shown in dotted lines. The mass of these arms and the base of the needle might be lighter than the body 1 and pointer 2, if desired, and the outer ends of the arms bent outward for the final adjustment. The best results, however, are obtained in the manner indicated by bending them inward, as shown. Needles of this type are made, preferably, of aluminium by stamping them out of thin sheets of that material, the mass from which the arms 4 4 are made having sufficient area to admit of being rolled or folded back and forth in the manner shown a number of times until the desired concentration of weght is obtained. In this manner I am enabled to construct a needle of the most delicate nature and particularly adapted for use in connection with instruments of the smaller type, such as pocket-voltmeters and the like.

Although I have described my novel form of index needle or pointer as especially applicable to electrical measuring instruments, I do not limit its use to that purpose, as it is obvious that such an index needle or pointer may have a wide use in the art of measuring instruments or instruments of precision generally where it is desired to use balanced index-needles of the most delicate nature, and my claims hereinafter made are designed to be of such scope as to include all such uses; nor do I limit my invention to the especial form of counterweight herein shown, as obviously it might be constructed so as to embody any number of integral, radial, or angularly-disposed arms 4 4 either at the extreme outer end of the needle, as shown, or at points intermediate the end and the pivot-support, and my claims are designed to include all such structures, as I believe it is broadly new with me to construct an index needle or pointer and one or more counterweights in one integral piece of a relatively soft, pliable, or yielding material in which the counterweights are disposed in such manner that by bending them either inward or outward toward or from the pivot-support the proper balance may be effected.

I am aware that it is, broadly, old in the art of instruments of precision—such as chronometers, indicators, and electrical measuring instruments—to construct an index needle or pointer and a counterweight of a single or integral piece of metal, generally of steel, in which the counterweight is so proportioned at the outset as to substantially balance the opposing body part of the needle, and I make no claim hereinafter broad enough to include such a structure. I am not aware, however, that any one has heretofore constructed an index needle or pointer and a counterweight of one integral piece of material adapted to be carried by the movable part of an instrument of precision and of such a nature that after the needle is put in place upon the movable part a further adjustment may be effected by bending or varying some part of the counterweight to compensate for errors of balance due to the union of the needle with the movable part, and my claims hereinafter made are generic as to this feature.

Having thus described my invention, what I claim, and desire to secure by Letters Patent of the United States, is—

1. An index needle or pointer for an electrical measuring instrument having one or more counterweights integral therewith, the counterweight or counterweights being adapted to be bent in such manner as to counterbalance the movable part of the instrument when secured thereto, substantially as described.

2. An index needle or pointer for an electrical measuring instrument having one or more arms integral therewith and adapted to be bent in such position as to counterbalance the movable coil and attached parts, substantially as described.

3. An index needle or pointer provided with a counterweight integral therewith, said counterweight being constructed by folding a part of the integral mass back and forth upon itself, substantially as described.

4. An index needle or pointer having a counterweight integral therewith, said counterweight being constructed by folding an area of the material of which it is made back and forth upon itself so as to constitute one or more laterally-extending arms, substantially as described.

5. An index needle or pointer having a counterweight integral therewith, said counterweight being constructed by folding the material of which it is made back and forth upon itself so as to constitute laterally-extending arms and bending the same inward until the desired proportional weight is attained, substantially as described.

In testimony whereof I have signed my name to this specification in the presence of two subscribing witnesses.

EDWARD WESTON.

Witnesses:
C. J. KINTNER,
W. H. YAWGER.